(12) United States Patent  (10) Patent No.: US 8,708,583 B2
Chamberlayne  (45) Date of Patent: Apr. 29, 2014

(54) CAMERA CARRYING DEVICE WITH LOCKING MECHANISM

(71) Applicant: Andrew Chamberlayne, North Vancouver (CA)

(72) Inventor: Andrew Chamberlayne, North Vancouver (CA)

(73) Assignee: Andrew Chamberlayne, North Vancouver (CA)

( * ) Notice: Subject to any disclaimer, the term of this patent is extended or adjusted under 35 U.S.C. 154(b) by 0 days.

(21) Appl. No.: 13/657,804

(22) Filed: Oct. 22, 2012

(65) Prior Publication Data

US 2013/0302023 A1  Nov. 14, 2013

Related U.S. Application Data

(63) Continuation-in-part of application No. 13/160,395, filed on Jun. 14, 2011, now Pat. No. 8,292,521, which is a continuation of application No. 12/202,922, filed on Sep. 2, 2008, now Pat. No. 7,980,771, which is a continuation-in-part of application No. 12/026,016, filed on Feb. 5, 2008, now abandoned.

(51) Int. Cl.
*G03B 17/00* (2006.01)

(52) U.S. Cl.
USPC ............................................... 396/423

(58) Field of Classification Search
USPC ............... 396/419, 420, 422, 423, 428, 544; 224/160, 197–200, 269, 271, 655; 348/373–376
See application file for complete search history.

(56) References Cited

U.S. PATENT DOCUMENTS

| | | | |
|---|---|---|---|
| 2,130,262 | A | 9/1938 | Burlin |
| 2,723,430 | A | 11/1955 | Paillard |
| 2,990,089 | A | 6/1961 | Nystrom |
| 3,884,403 | A | 5/1975 | Brewer |
| 3,938,166 | A | 2/1976 | Sloop |
| 4,058,242 | A | 11/1977 | Brewer |

(Continued)

FOREIGN PATENT DOCUMENTS

| | | |
|---|---|---|
| GB | 871489 | 6/1961 |
| JP | 2000321655 | 11/2000 |

(Continued)

OTHER PUBLICATIONS

Abstract of Japanese Publication No. 2003116621 with data supplied by the espacenet database Apr. 22, 2003.

(Continued)

*Primary Examiner* — Clayton E Laballe
*Assistant Examiner* — Minh Phan
(74) *Attorney, Agent, or Firm* — Cameron IP

(57) ABSTRACT

A device for rotatably mounting a camera on a person carrying a bag comprises a body with lateral flaps on opposite sides thereof. The lateral flaps are foldable along lines of weakness to allow the device to hug a strap of the bag. A female connector is disposed on the body and has a U-shaped slot defined by a curved pocket and a pair of opposed channels which extend from the pocket. The male connector has a plate and threaded member extending from the plate. The threaded member is for engaging a threaded female tripod receiver of the camera extending from the plate. The plate is slidably received by the U-shaped slot of the female connector and the plate is freely rotatable within the U-shaped slot of the female connector.

5 Claims, 20 Drawing Sheets

(56) References Cited

U.S. PATENT DOCUMENTS

| | | | |
|---|---|---|---|
| 4,328,917 A | 5/1982 | Reeberg | |
| 4,416,405 A | 11/1983 | Caillouet | |
| 4,419,794 A | 12/1983 | Horton, Jr. et al. | |
| 4,461,411 A | 7/1984 | Harrow | |
| 4,473,177 A | 9/1984 | Parandes | |
| 4,714,184 A | 12/1987 | Young et al. | |
| 5,014,892 A | 5/1991 | Copeland | |
| 5,172,838 A | 12/1992 | Rowell et al. | |
| 5,251,800 A | 10/1993 | Leenders | |
| 5,375,749 A | 12/1994 | Oliva | |
| 5,850,954 A | 12/1998 | Dong-Joo | |
| 5,850,996 A | 12/1998 | Liang | |
| 6,905,051 B2 | 6/2005 | Chee | |
| 7,162,281 B2 | 1/2007 | Kim | |
| 7,624,901 B1 | 12/2009 | Mozes | |
| 7,980,771 B2 * | 7/2011 | Chamberlayne | 396/423 |
| 8,292,521 B2 * | 10/2012 | Chamberlayne | 396/423 |
| 2003/0098323 A1 | 5/2003 | Taylor et al. | |
| 2004/0200867 A1 | 10/2004 | Chee | |
| 2009/0196596 A1 | 8/2009 | Chamberlayne | |
| 2010/0054724 A1 | 3/2010 | Chamberlayne | |

FOREIGN PATENT DOCUMENTS

| | | |
|---|---|---|
| JP | 2003116621 | 4/2003 |
| WO | WO 83/01370 | 4/1983 |
| WO | WO 97/36516 | 10/1997 |
| WO | WO 2009/039292 | 3/2009 |

OTHER PUBLICATIONS

Abstract of Japanese Publication No. 2000321655 with data supplied by the espacenet database Nov. 24, 2000.

Printout from https://peakdesignltd.com/capture/ Date of publication is unknown to Applicant.

* cited by examiner

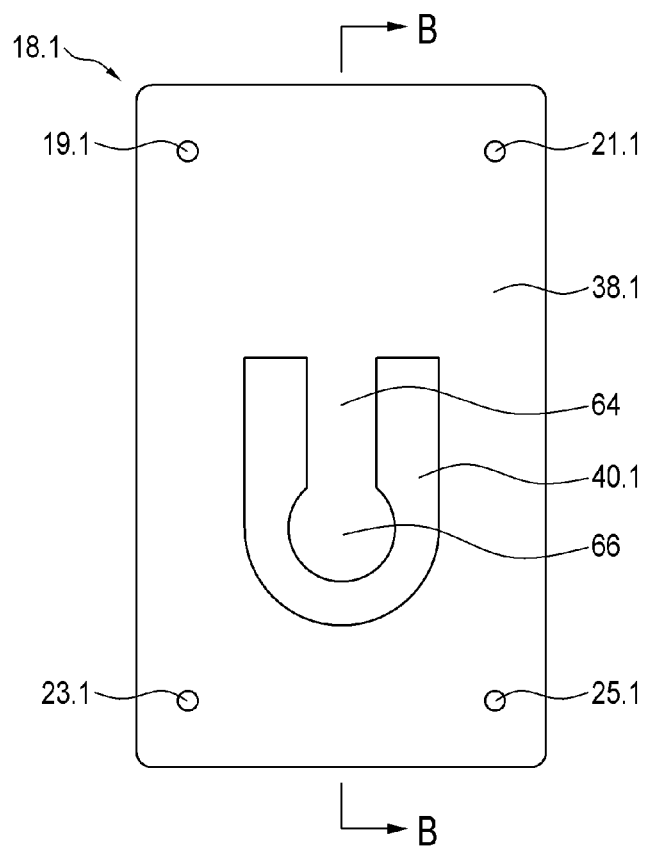
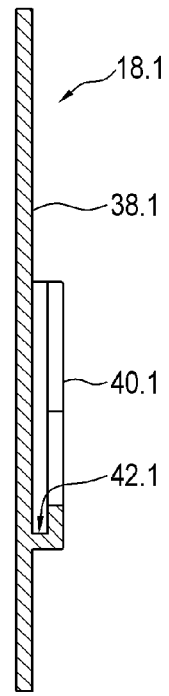
FIG. 13
FIG. 14

CAMERA CARRYING DEVICE WITH LOCKING MECHANISM

CROSS-REFERENCE TO RELATED APPLICATION

This application is a continuation-in-part of U.S. patent application Ser. No. 13/160,395 filed on Jun. 14, 2011 which is a continuation of U.S. Pat. No. 7,980,771 filed on Sep. 2, 2008 which is a continuation-in-part of U.S. patent application Ser. No. 12/026,016 filed on Feb. 5, 2008 and now abandoned. The full disclosures of the aforementioned are hereby incorporated herein by reference and priority to the same is claimed.

BACKGROUND OF THE INVENTION

1. Field of the Invention

The present invention relates to a camera carrying device and, in particular, to a device for rotatably mounting a camera on a person.

2. Description of the Related Art

Camera carrying devices are well known, the simplest being a strap, secured to a camera, which allows a person to carry the camera around their neck or shoulder. However, the strap allows the camera to swing freely about the person. The camera may therefore become damaged upon impact with the person or another object. The strap may also become entangled with either the camera, the person, or another object and consequently interfere with the person's ability to take a picture. To overcome the above-mentioned shortcomings numerous body-mounted camera cases have been developed. Carrying a camera disposed within a body-mounted camera case removes the need to have a strap secured to the camera. However, body-mounted camera cases are also limiting. The time required to remove the camera from within the case may prevent a person from taking a desired picture, particularly, in situations where the scene is fluid.

U.S. Pat. No. 5,375,749 to Oliva discloses a multi-purpose holster apparatus that may be used to carry a camera, and which offers an alternative to traditional camera straps and cases. The holster apparatus disclosed by Oliva comprises a frame (20) that is received on a belt or a waistband. A sleeve (24) is integrally formed with and protrudes from the frame (20). The sleeve (24) is designed for releasable engagement with an interlocking plate (36). The interlocking plate (36) supports threaded bolt (31) which is designed to fit into a threaded female tripod receiver of a camera. Accordingly, the holster apparatus disclosed by Oliva may be used to carry a camera on the waist. However, it is awkward for a person to carry a larger camera, similar to the type used by a professional photographer, on their waist. Furthermore, it is difficult for a person to operate certain features of a camera since the camera is neither rotatable nor at chest level.

There is therefore a need for an improved camera carrying device.

SUMMARY OF THE INVENTION

It is an object of the present invention to provide a device for rotatably mounting a camera on a person and, in particular, on a person's chest.

There is accordingly provided a device for rotatably mounting a camera on a person. The device comprises a female connector and a male connector. The female connector has a U-shaped slot defined by a curved pocket and a pair of opposed channels which extend from the pocket. The male connector has a plate and threaded member extending from the plate. The threaded member is for engaging a threaded female tripod receiver of the camera extending from the plate. The plate is slidably received by the U-shaped slot of the female connector and the plate is freely rotatable within the U-shaped slot of the female connector. A strap assembly is connected to the female connector. The strap assembly is for mounting the device to a person. The plate has a first rotatable position within the pocket of the female connector in which the male connector is secured to the female connector, and a second rotatable position within the pocket of the female connector in which the male connector is releasable from the female connector.

There is also provided a device for rotatably mounting a camera on a person carrying a bag. The device comprises a body with lateral flaps on opposite sides thereof. The lateral flaps are foldable along lines of weakness to allow the device to hug a strap of the bag. There is a female connector and a male connector. The female connector is disposed on the body and has a U-shaped slot defined by a curved pocket and a pair of opposed channels which extend from the pocket. The male connector has a plate and threaded member extending from the plate. The threaded member is for engaging a threaded female tripod receiver of the camera extending from the plate. The plate is slidably received by the U-shaped slot of the female connector and the plate is freely rotatable within the U-shaped slot of the female connector. The plate has a first rotatable position within the pocket of the female connector in which the male connector is secured to the female connector, and a second rotatable position within the pocket of the female connector in which the male connector is releasable from the female connector. The lateral flaps may be provided with fasteners to allow the lateral flaps to be releasably secured to one another when the device hugs the strap of the bag. The device may include a friction pad on a rear of the body. The device may include a support strap on a rear of the body. The device may include a ring for allowing the device to be tethered.

The devices disclosed herein provide the advantage of allowing a person to comfortably carry an easily retrievable camera at chest level on their torso. The device also provides the advantage of allowing a person to operate various features of the camera while carrying the camera in a hands-free manner. For example, the device allows for the changing of telescopic lens and the viewing of a rear screen of a digital camera.

Furthermore, the device is provided with a locking mechanism which prevents the carried camera from becoming accidentally decoupled from the device.

BRIEF DESCRIPTIONS OF DRAWINGS

The invention will be more readily understood from the following description of the embodiments thereof given, by way of example only, with reference to the accompanying drawings, in which:

FIG. 13 is a front elevation view of another embodiment of the female connector of the device of FIG. 4;

FIG. 14 is an elevation, cross-sectional view taken down line B-B of FIG. 13;

DESCRIPTIONS OF THE PREFERRED EMBODIMENTS

Figure 1:
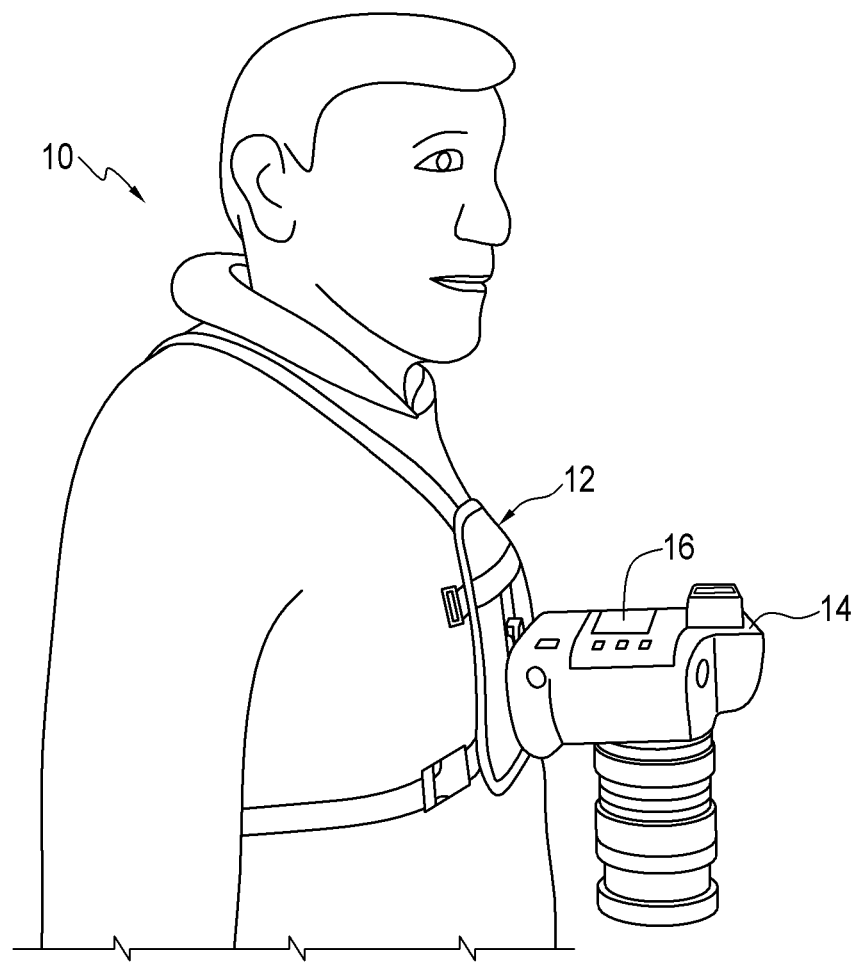
FIG. 1 is a side perspective view showing a camera rotatably mounted on a person, by a device according to an embodiment of the invention, wherein the camera is in a first position.
Figure 2:
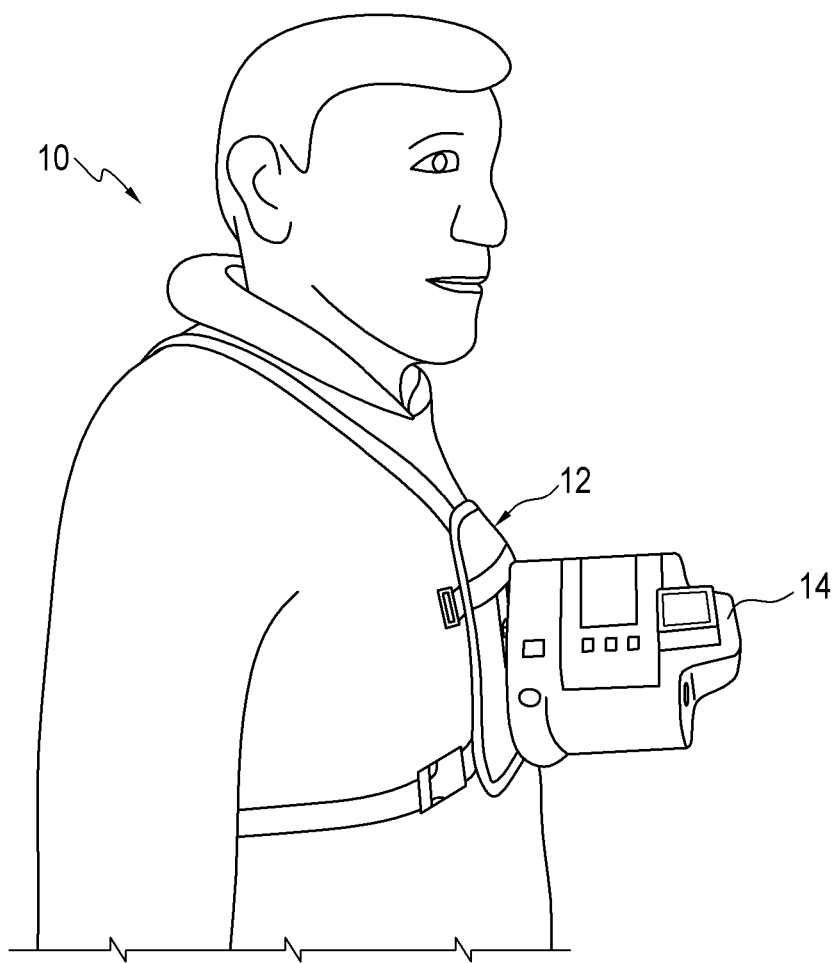
FIG. 2 is a side perspective view showing a camera rotatably mounted on a person wherein the camera is in an intermediate position.
Figure 3:
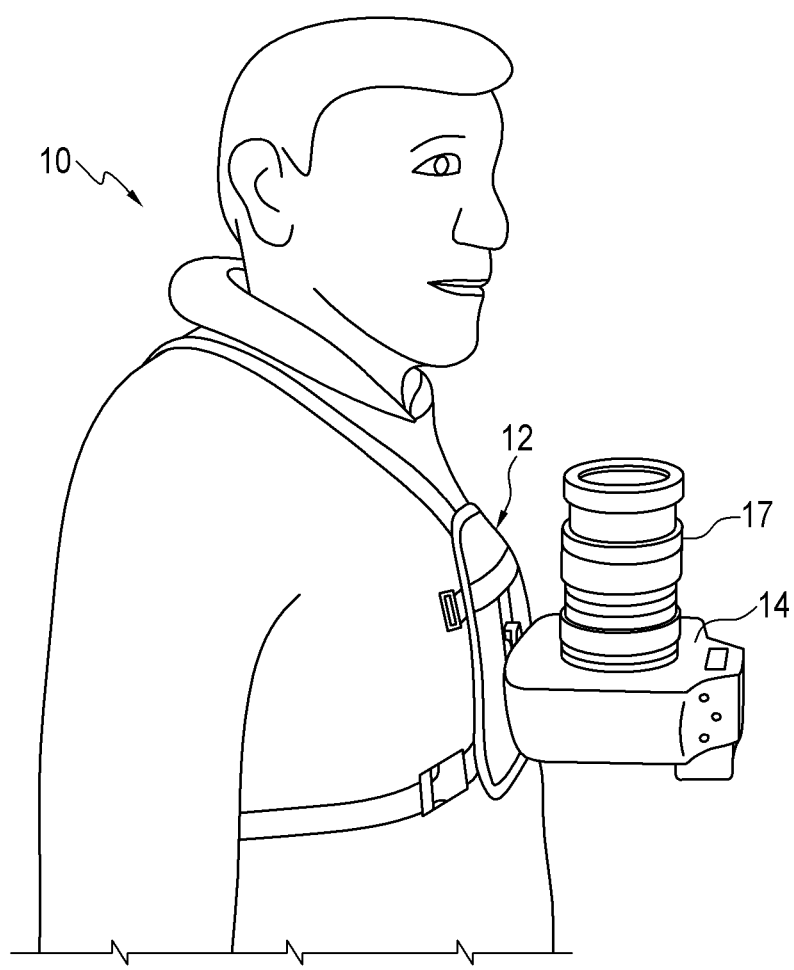
FIG. 3 is a side perspective view showing a camera rotatably mounted on a person wherein the camera is in a second position.

Referring to the drawings and first to FIG. 1, Referring to the drawings, and first to FIGS. 1 to 3, a person 10 is shown wearing a device 12 with a camera 14 rotatably secured thereon. FIG. 1 shows the camera 14 in a first position. In the first position, the camera 14 faces downwardly, allowing the person 10 to view digital photographs, or video, on a screen 16 disposed on a back of the camera 14. FIG. 3 shows the camera 14 in a second position. In the second position, the camera 14 faces upwardly, allowing the person 10 to change a lens 17 disposed on a front of the camera 14. The second position is particularly useful for professional photographers who are often required to change lenses. FIG. 2 shows the camera 14 in an intermediate position as it is freely rotated between the first and second positions. It will be understood by a person skilled in the art that the terms "downwardly" and "upwardly" are used solely in relation to the position of the camera 14 as shown in FIGS. 1 and 3 respectively. It will further be understood by a person skilled in the art that although the device 12 disclosed herein is particularly useful for carrying a digital camera, other forms of equipment may be carried using the device 12.

Figure 4:
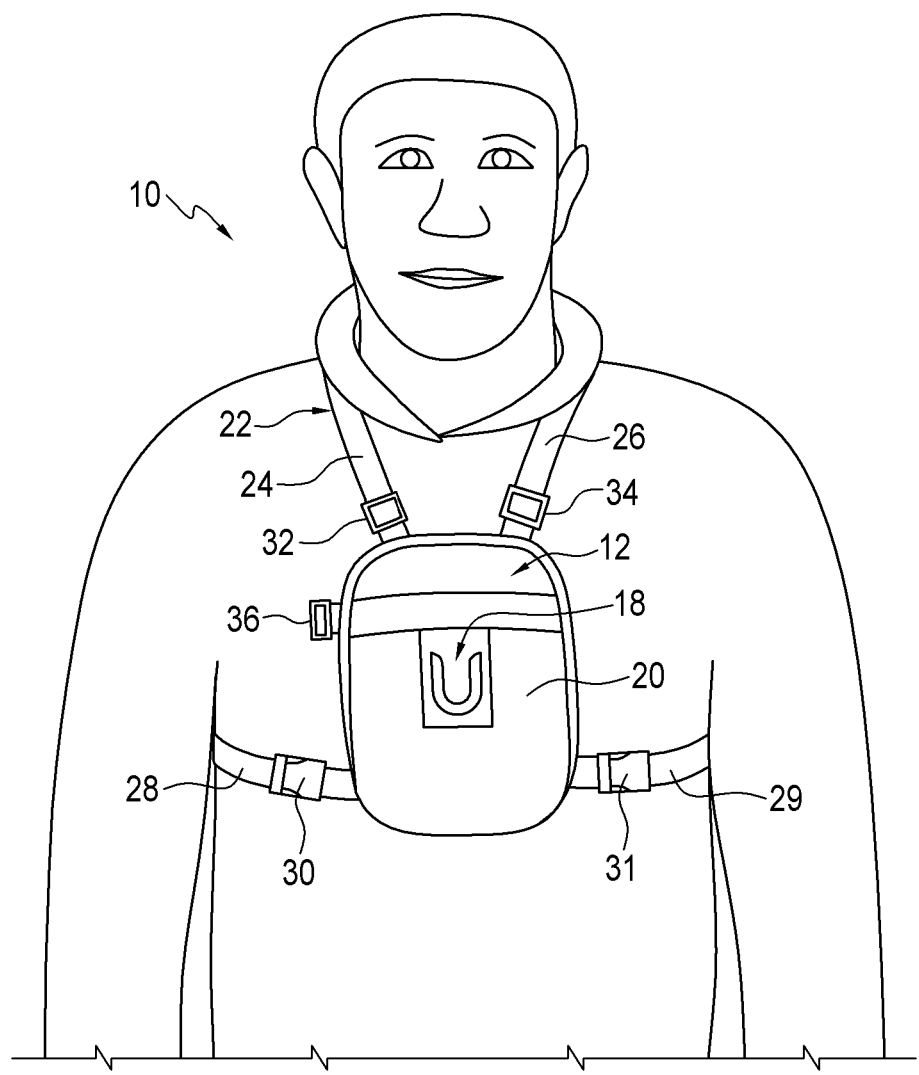
FIG. 4 is a front perspective showing view a device used to rotatably mount a camera on a person wherein the device is secured to the person by a strap assembly.
Figure 21:
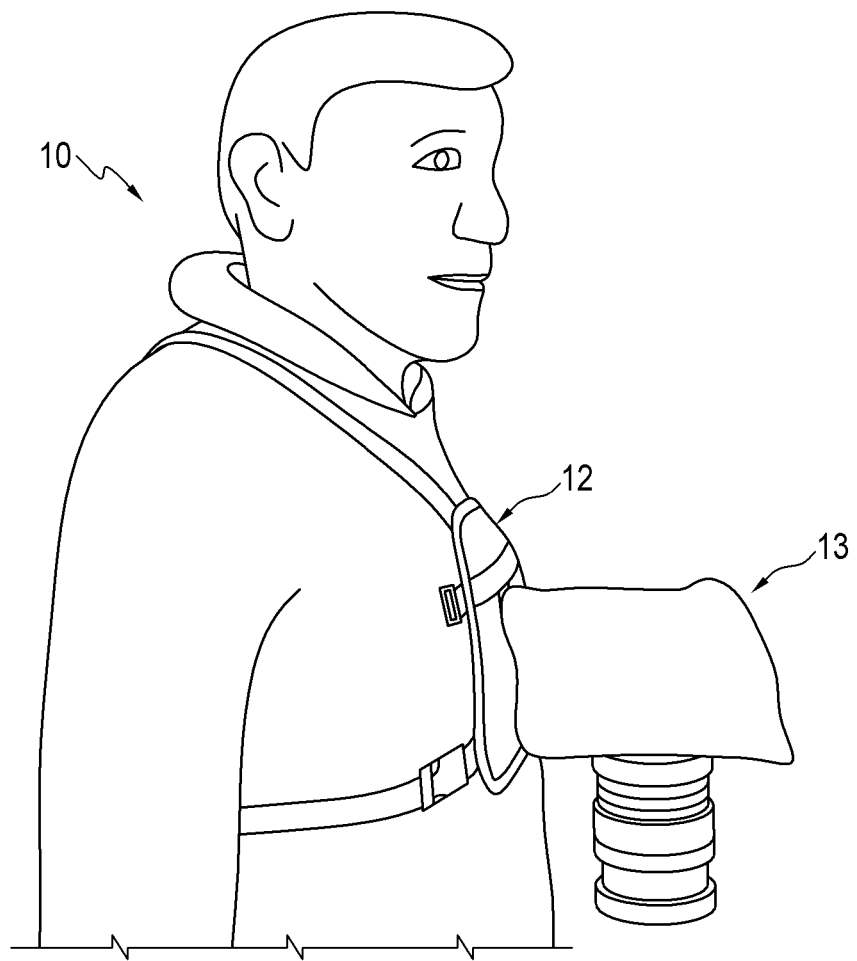
FIG. 21 is a side perspective view showing a camera rotatably mounted on a person wherein the camera is covered by a tarp.

Referring now to FIG. 4, the person 10 is shown wearing the device 12 without the camera 14 secured thereto. The device 12 comprises a first connecting means, in the form of a female connector 18, which is mounted on the person's chest. In this example, the female connector 18 is disposed within a fabric jacket 20 although this is not a requirement. The female connector 18 and the fabric jacket 20 are mounted on the person 10 using a strap assembly 22. The strap assembly 22 comprises securing and adjusting means for securing and adjusting straps 24, 26, 28, and 29 about the person. In this example, the securing and adjusting means comprise buckles 30 and 31 and tension straps 32 and 34. However, any suitable form of fastener may be used. Means for allowing additional equipment to be connected to the device 12, for example a tension strap 36 as shown in FIG. 4, may also be provided on either the fabric jacket 20 or any one of the straps 24, 26, 28, and 29. FIG. 21 shows a tarp 13 attached to the fabric jacket 20. The tarp 13 may be used to cover the camera 14 to protect it from rain, snow, or other elements.

Figure 5:
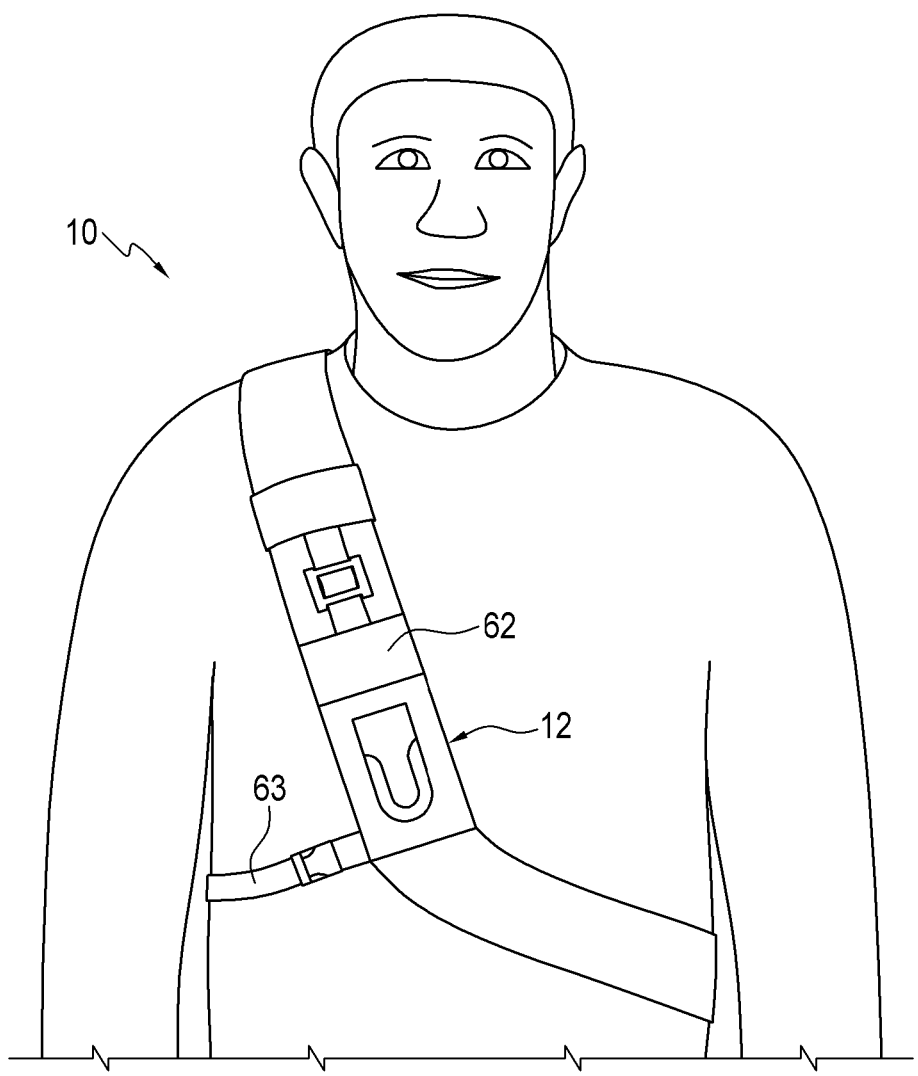
FIG. 5 is a front perspective view showing a device used to rotatably mount a camera on a person wherein the device is integrated into a backpack strap.

As shown in FIG. 5, the device 12 may alternatively be secured to a backpack strap 62. The device 12 may be integrated into the backpack strap 62 during the manufacturing of the backpack (not shown) or the device 12 may be secured to and released from the backpack strap 62 as an independent accessory. Preferably, the device 12 is also secured to a secondary strap 63 of the backpack. This helps ensure that the device is maintained in a desired position as the person 10 moves.

Figure 6:
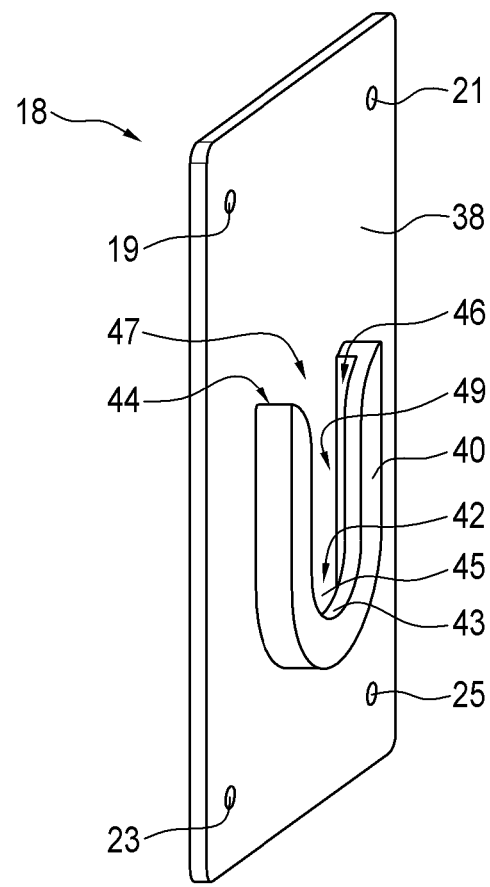
FIG. 6 is a perspective view showing a female connector of the device of FIG. 4.
Figure 7:
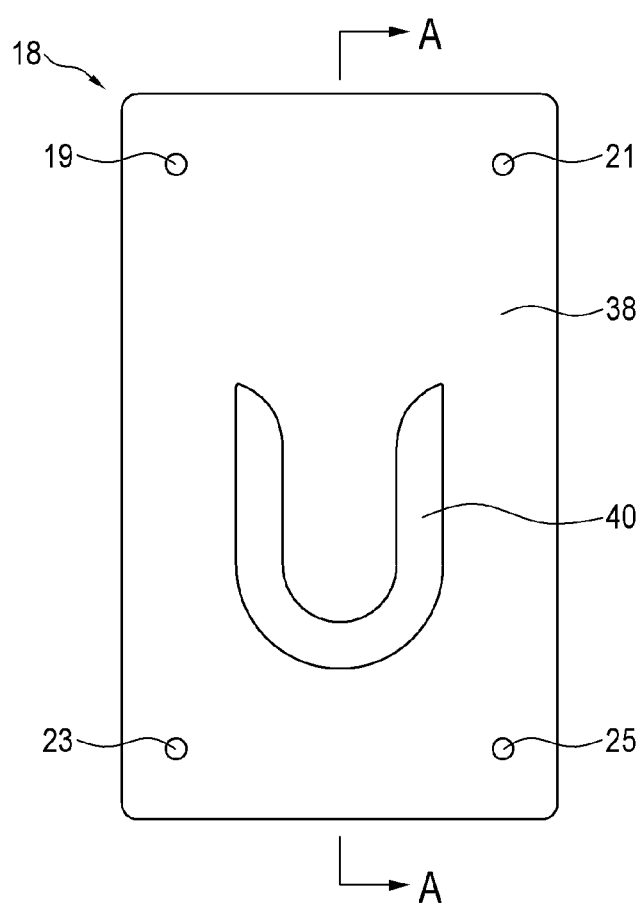
FIG. 7 is a front elevation view of the female connector of FIG. 6.
Figure 8:
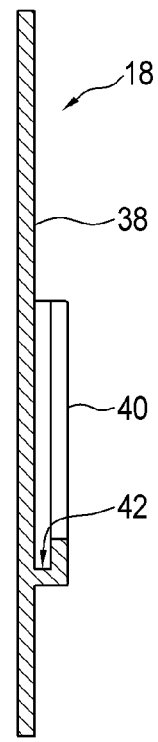
FIG. 8 is an elevation, cross-sectional view taken down line A-A of FIG. 7.

The female connector 18, which is shown in greater detail in FIGS. 6 to 8, includes a plate 38 and a hollow U-shaped protrusion 40. The U-shaped protrusion is integrally formed with and protrudes from the plate 38. In this example, the plate 38 is generally rectangular and has apertures 19, 21, 23, and 25 near each corner thereof. The apertures 19, 21, 23, and 25 provide means to connect the female connector 18 to the fabric jacket 20. Alternatively, in another embodiment, the apertures 19, 21, 23, and 25 may be used to connect the female connector 18 directly to the strap assembly 22.

As best shown in FIG. 6, the plate 38 and the U-shaped protrusion 40 define a generally curved pocket 42 and a pair of opposed channels 44 and 46 which extend from the pocket 42. The pocket 42 and the channels 44 and 46 define a U-shaped receptacle, or U-shaped slot 49, which may slidably receive a plate through an opening 47 disposed between the channels 44 and 46. There is a lip 43 at a mouth 45 of the pocket 42.

Figure 9:
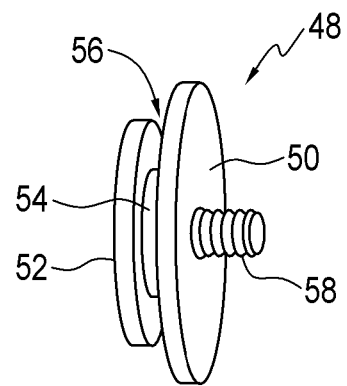
FIG. 9 is a perspective view showing a male connector of the device of FIG. 4.
Figure 10:
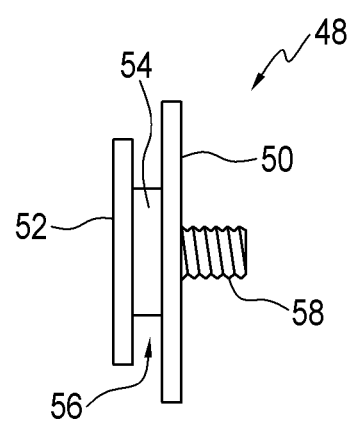
FIG. 10 is a side elevation view of the male connector of FIG. 8.
Figure 20:
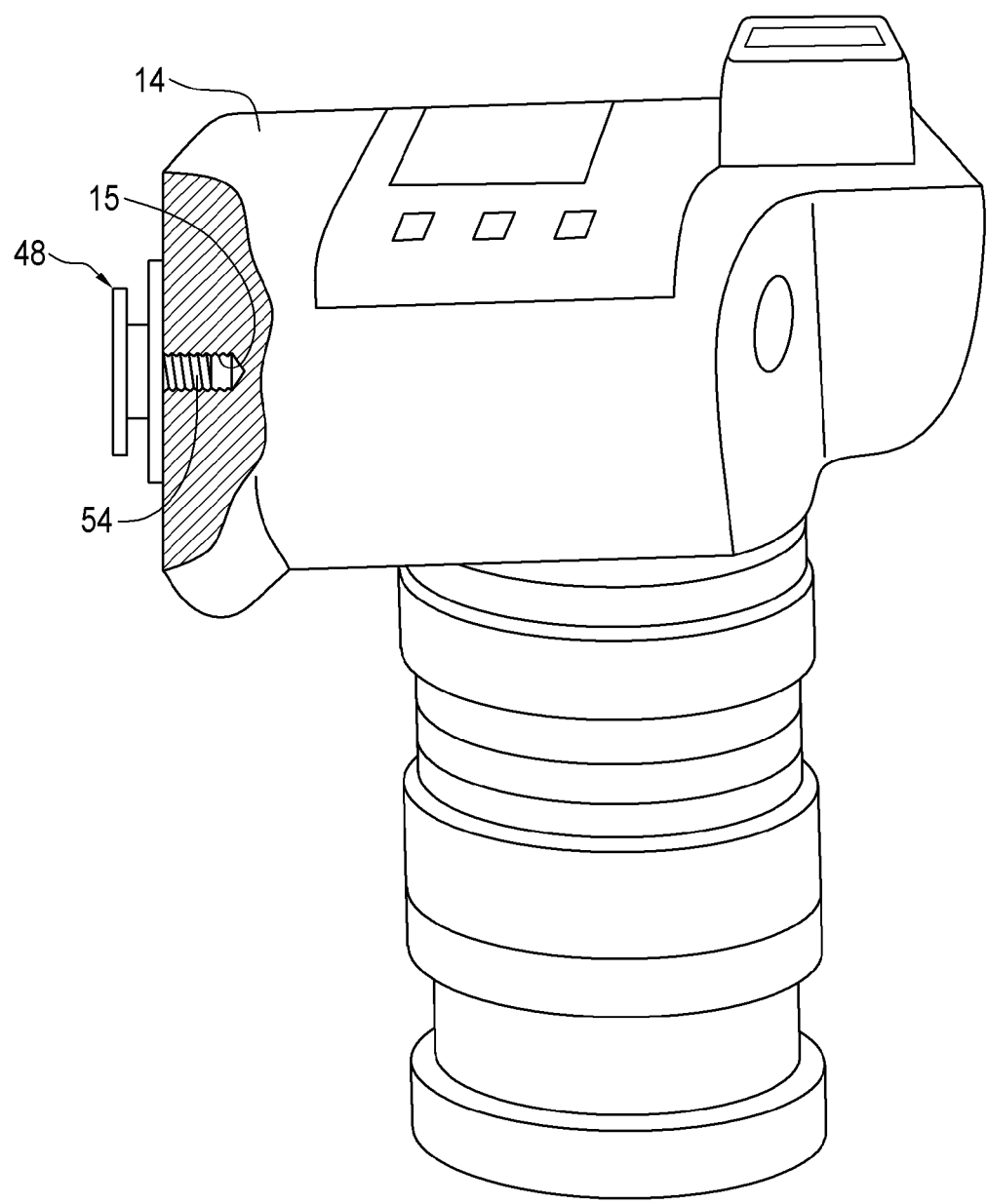
FIG. 20 is a perspective view, partially in section, showing the male connector of FIG. 9 engaged with a threaded female tripod receiver of a camera.

Referring now to FIGS. 9 and 10, a second connecting means of the device 12, in the form male connector 48, is shown in greater detail. The male connector 48 includes a pair of circular plates 50 and 52 which are spaced-apart by a cylindrical body 54. The cylindrical body 54 has a smaller diameter than the plates 50 and 52, and defines an annular recess 56 between the plates 50 and 52. In this example, the plates 50 and 52 differ in diameter although this is not a requirement. A threaded member 58 extends outwardly from the male connector 48. The threaded member 58 is designed to engage a threaded female tripod receiver 15 of the camera 14 as best shown in FIG. 20. The plates 50 and 52 may also be grooved (not shown) along their circumferences to assist a person in gripping the male connector 48 when screwing the threaded member 58 into the female tripod receiver 15 of the camera 14.

Figure 11:
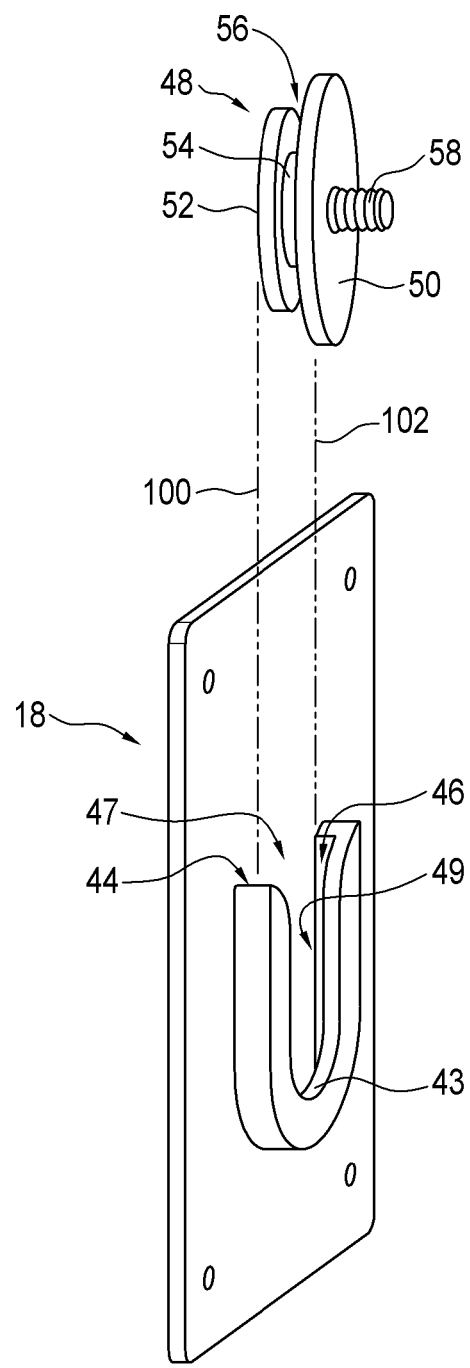
FIG. 11 is an exploded view showing the female connector of FIG. 6 and the male connector of FIG. 9.
Figure 12:
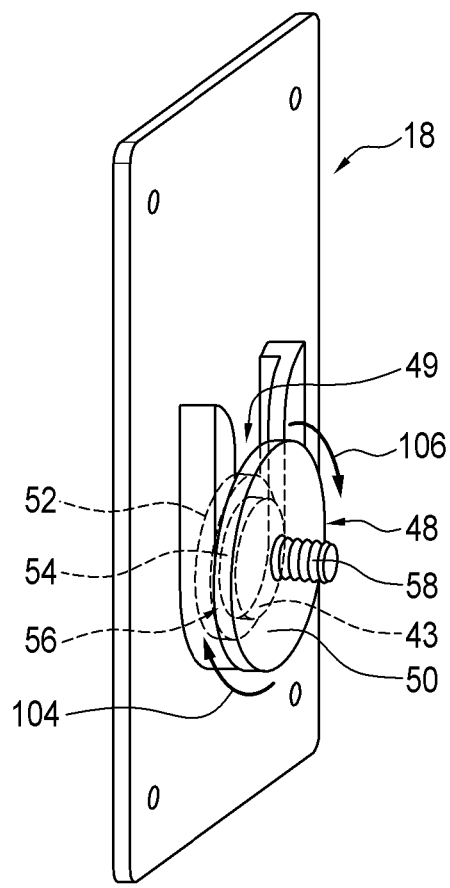
FIG. 12 is a perspective, partially in section, view showing the female connector of FIG. 6 and the male connector of FIG. 9.

As best shown in FIGS. 11 and 12, the U-shape of the slot 49 of the female connector 18 and the generally annular shape of the male connector 48 allow the male connector 48 to be rotatably received by the female connector 18. Referring to FIG. 11, in particular, a first one of the plates 52 of the male connector 48 is slidably received by the U-shaped slot 49 of the female connector 18. Said first one of the plates 52 is received though the opening 47 between the channels 44 and 46 as indicated by broken lines 100 and 102. As best shown in FIG. 12, when said first one of the plates 52 of the male connector 48 is received by the U-shaped slot 49 of the female connector 18, the cylindrical block 54 of the male connector 48 rests on the lip 43 of the pocket 42, which is shown in FIG. 6, of the female connector 18. The annular recess 56 of the male connector 18 engages the lip 43 of the pocket 42 of the female connector 18. Accordingly, the plates 50 and 52 of male connector 40 are on opposite sides of the U-shaped slot 49 of the female connector 18. This prevents accidental decoupling of the male connector 48 and the female connector 18 while still allowing the male connector 48 to rotated bi-directionally relative to the female connector 18 as indicated generally by arrows 104 and 106.

In operation, the threaded member 58 of the male connector 48 is engaged with the threaded female tripod receiver 15 of the camera 14 as shown in FIG. 20. The male connector 48 can then be coupled, as described above, to the female connector 18 which is mounted on the person 10 by the strap assembly 22 as shown in FIG. 3. This allows the person 10 to carry the camera 14 in a hands-free manner, at chest level, as shown in FIGS. 1 to 3. The camera 14 can be rapidly and easily removed from the device 12 because the male connector 48 is simply slidably received by the female connector 18. Furthermore, because the male connector 48 is rotatably coupled to the female connector 18, the carried camera 14 can be rotated between the first position shown in FIG. 1 and the second position shown in FIG. 3. This provides the advantage of allowing the person 10 to view digital photographs, or video, on the camera screen 16 disposed on the carried camera 14 and change the lens 18 of the carried camera 14.

Figure 15:
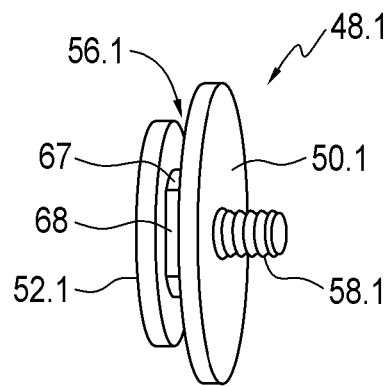
FIG. 15 is a perspective view of another embodiment of the male connector of the device of FIG. 4.
Figure 16:
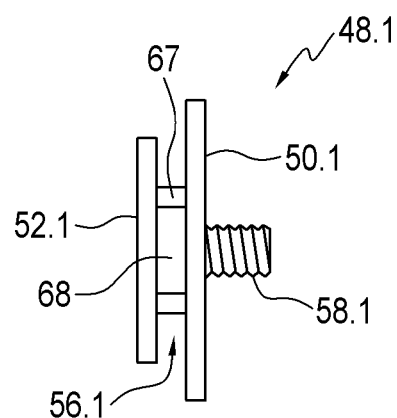
FIG. 16 is a side elevation view of the male connector of FIG. 15.
Figure 17:
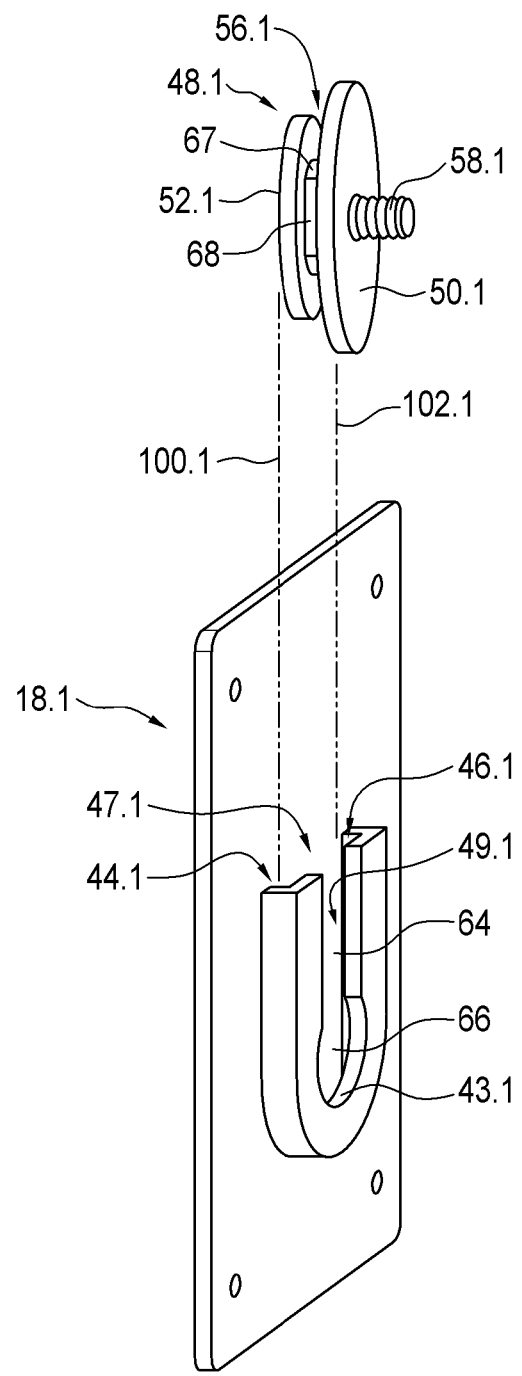
FIG. 17 is an exploded view showing the female connector of FIG. 13 and the male connector of the FIG. 15.
Figure 18:
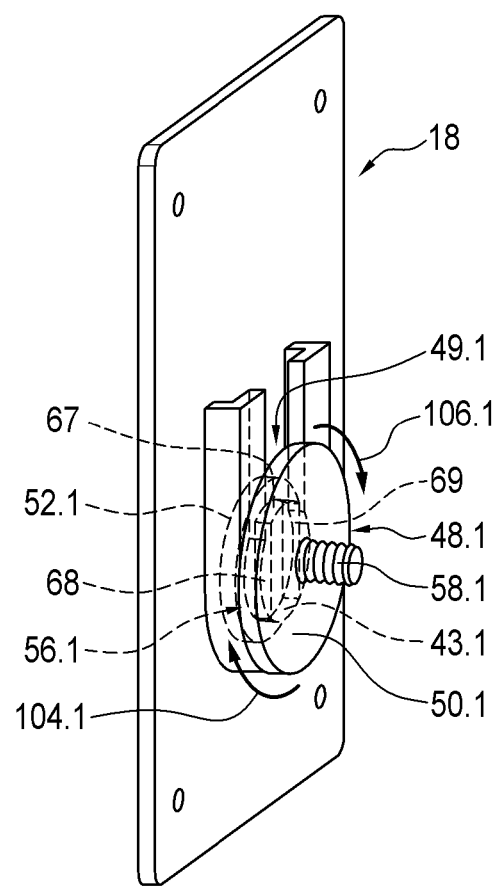
FIG. 18 is a perspective, partially in section, view showing the female connector of FIG. 13 and the male connector of the FIG. 15 in a releasable position.
Figure 19:
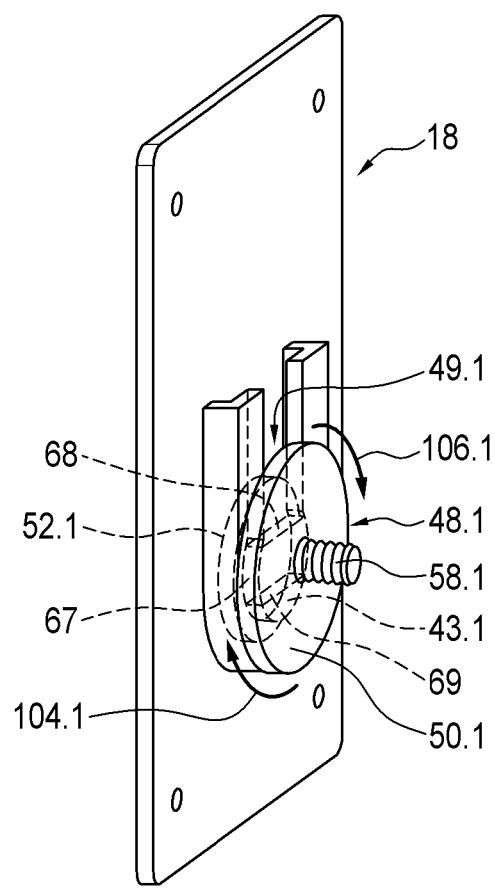
FIG. 19 is a perspective, partially in section, view showing the female connector of FIG. 13 and the male connector of the FIG. 15 in a locked position.

Referring now to FIGS. 13 and 14 another embodiment of the female connector 18.1 is shown. In FIGS. 13 and 14 like parts have been given like reference numerals as in FIGS. 7 and 8 with the additional numerical designation ".1". The U-shaped protrusion 40.1 of the female connector 18.1 has a bulb shaped opening defined by an elongate portion 64 and circular portion 66. FIGS. 15 and 16 show an embodiment of the male connector 48.1 which is used with the female connector 18.1 shown in FIGS. 13 and 14. In FIGS. 15 and 16 like parts have been given like reference numerals as in FIGS. 9 and 10 with the additional numerical designation ".1". A truncated cylindrical body 67 of the male connector 48.1 has a pair of opposite flat edges 68 and 69. Only a first one the flats edge 68 is shown in FIGS. 15 to 17 with both flat edges 68 and 69 being shown in FIGS. 18 and 19. In FIGS. 17 to 19 like parts have been given like reference numerals as in FIGS. 11 and 12 with the additional numerical designation ".1".

Referring now to FIG. 17, the male connector 48.1 is only received by the female connector 18.1 in a particular circumstance. In particular, the flat edges 68 and 69 of the truncated cylindrical body 67 of the male connector 48.1 must be aligned with the elongate portion 64 of the bulb shaped opening in the U-shaped protrusion 40.1 of the female connector 18.1, i.e with channels 44.1 and 46.1. Otherwise the cross-extent of the body truncated cylindrical body 67 of the male connector 48.1 will be too wide to pass through the elongate portion 64 of the bulb shaped opening in the U-shaped protrusion 40.1 of the female connector 18.1.

Once the male connector 48.1 has been received by the female connector 18.1, as shown in FIG. 18, the male connector 48.1 may be rotated as indicated by either arrow 104.1 or 106.1. The flat edges 68 and 69 of the truncated cylindrical body 67 of the male connector 48.1 are brought out of alignment with the elongate portion 64 of the bulb shaped opening in the U-shaped protrusion 40.1 of the female connector 18.1. This is shown in FIG. 19. In this position the male connector 48.1 is locked in place and cannot be decoupled from the female connector 18.1. To release the male connector 48.1 from the female connector 18.1, the male connector 48.1 is rotated as indicated by either arrows 104.1 or 106.1 to bring the flat edges 68 and 69 of the truncated cylindrical body 67 of the male connector 48.1 back into alignment with the elongate portion 64 of the bulb shaped opening in the U-shaped protrusion 40.1 of the female connector 18.1. This is shown in FIG. 18. This locking mechanism prevents the carried camera 14 from becoming accidentally decoupled from the device 12.

Figure 22:
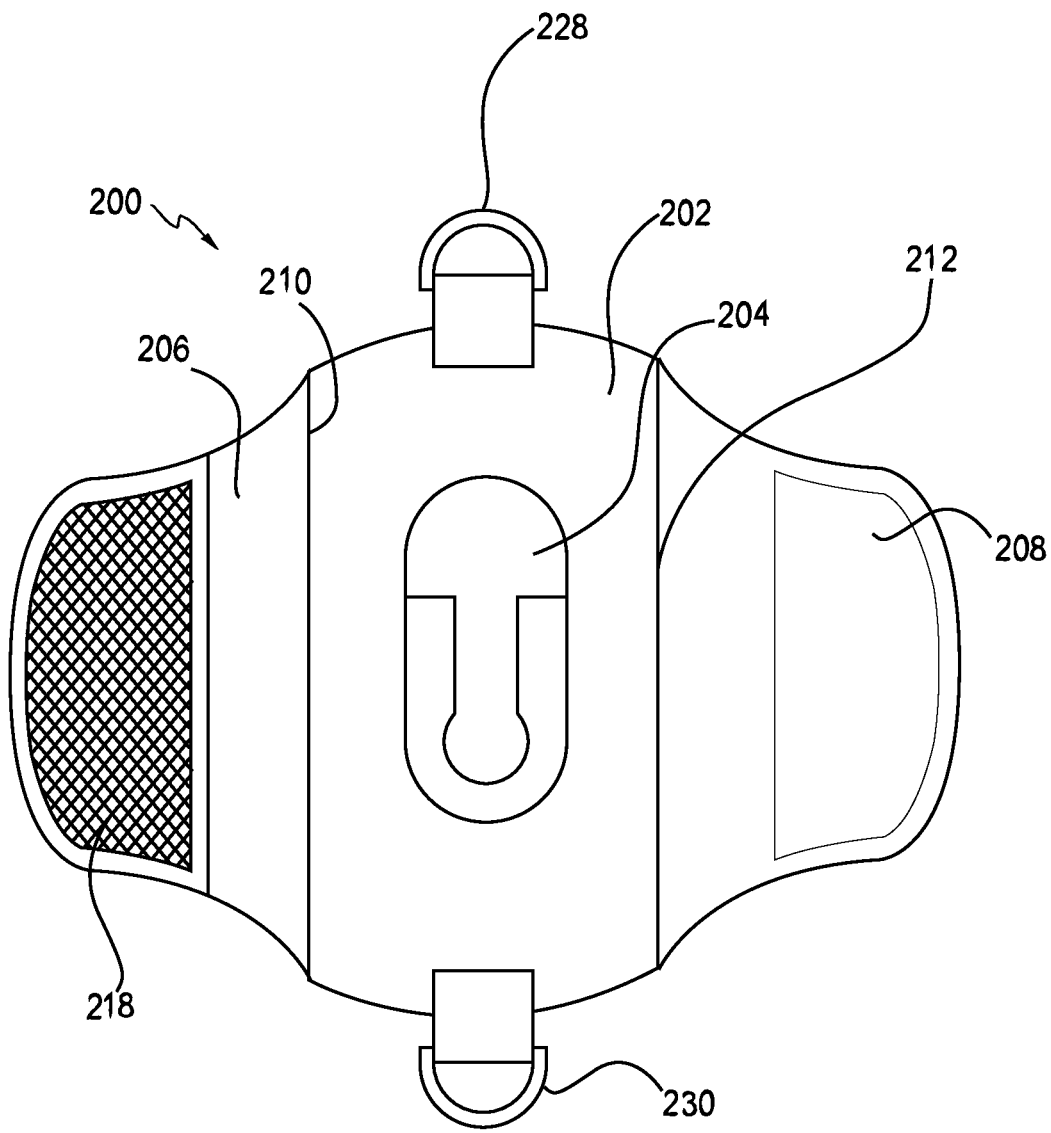
FIG. 22 is a front perspective view of another device used to rotatably mount a camera to a person.
Figure 23:
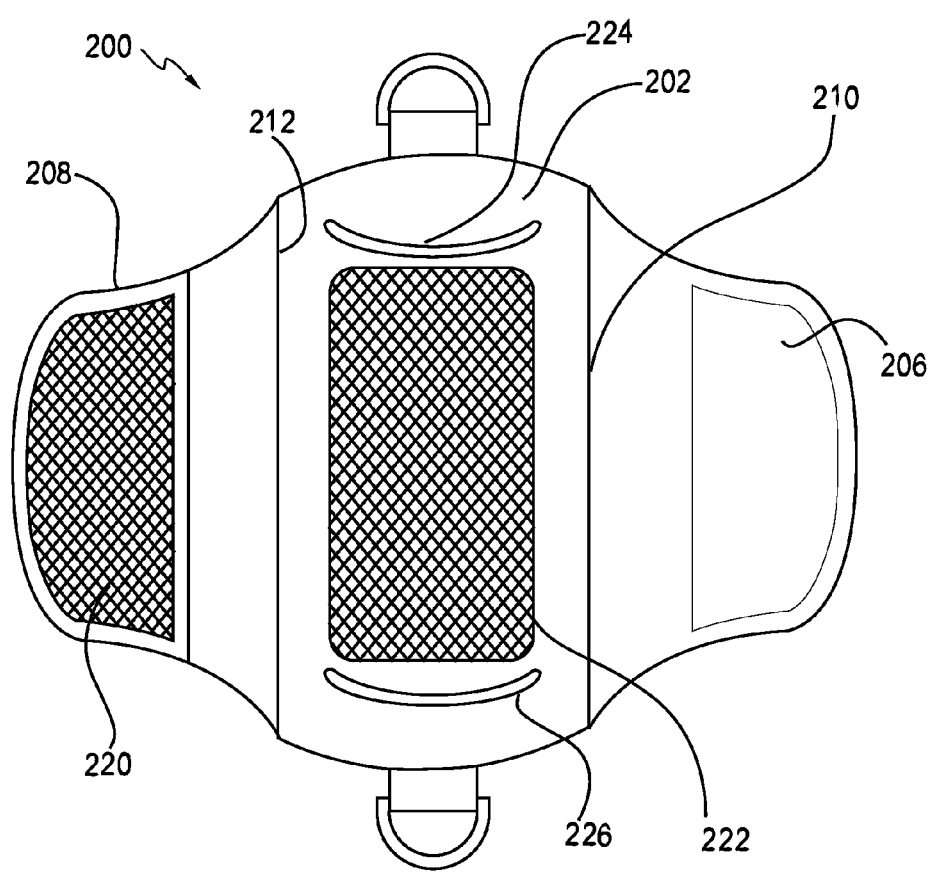
FIG. 23 is a rear perspective view of the device of FIG. 22.
Figure 24:
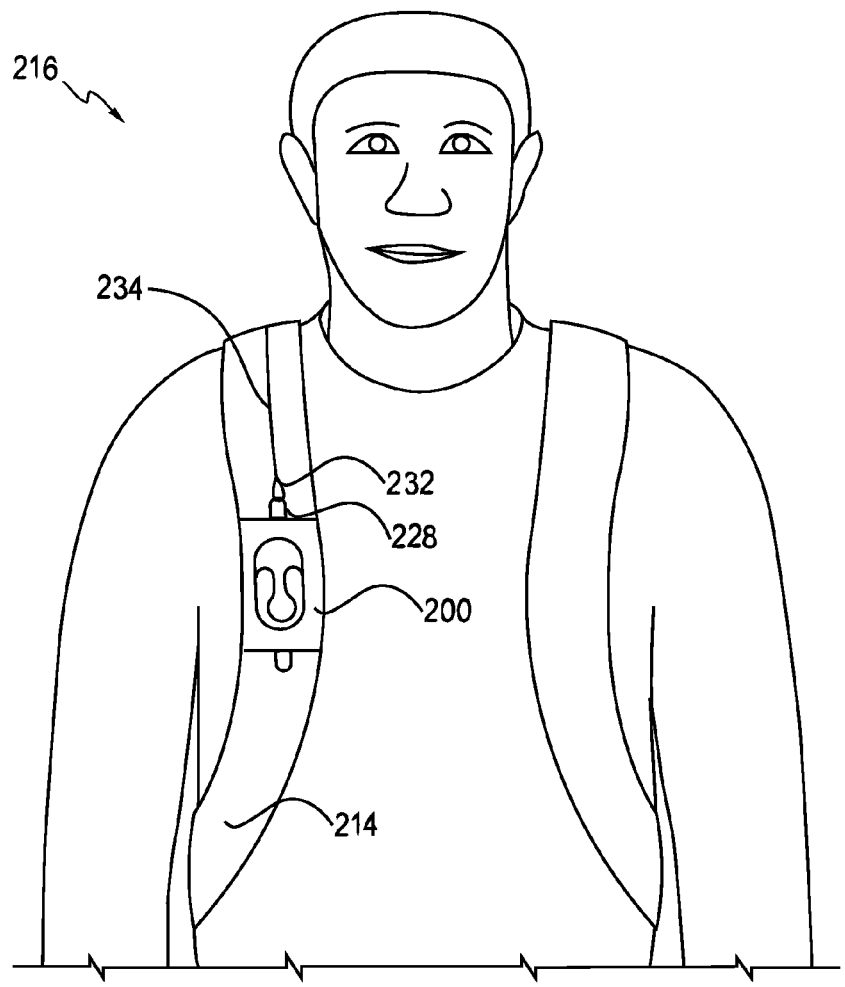
FIG. 24 is a front perspective view of the device of FIG. 22 secured to a backpack strap.

Referring now to FIGS. 22 and 23 another embodiment of a device 200 used to rotatably mount camera to a person is shown. The device 200 includes a body 202 on which a first connecting means, in the form of a female connector 204, is disposed. The female connector 204 is substantially similar to the female connector 18.1 shown in FIGS. 17 to 19. There are lateral flaps 206 and 208 on opposite sides of the body 202. The lateral flaps 206 and 208 are foldable along respective lines of weakness 210 and 212. This allows the device 200 to hug a strap, for example, a backpack strap 214 as shown in FIG. 24. The device 200 is thereby mounted to a person 216 at chest level which allows a camera (not shown) provided with a male connector as shown in FIG. 20 to be rotatably mounted to the person 216.

Referring back to FIGS. 22 and 23, there are fasteners 218 and 220 on the lateral flaps 206 and 208. The fasteners 218 and 220 allow the flaps 206 and 208 to be releasably secured to one another and allow the device to hug the strap 214 as shown in FIG. 24. In this example, the fasteners 218 and 220 in the form of hook and loop fastener strips sold under the trademark VELCRO® but other types of fasteners may be used in other examples. The device 200 is also provided with a friction pad 222 on a rear of the body 202. The friction pad 222 in this example is a VELCRO® hook strip and functions to prevent the device 200 from slipping or sliding along the backpack strap 214. There are also support straps 224 and 226 on the back of the device 200. The backpack strap 214 may be weaved with the support straps 224 and 226 to further secure the device to the backpack strap 214. There are rings 228 and 230 connected to the body of the device. As shown in FIG. 24 for one of the rings 228, a clip 232 on a tether 234 may engage the ring 228 to tether the device 200 and thereby further secure the device to the person. The device 200 is for device for rotatably mounting a camera on a person carrying a bag.

It will be understood by a person skilled in the art that although in this example the male connector is secured to the camera and the female connector is mounted on the person's chest that in other examples a male connector may be secured to the camera and a female connector may be mounted on the person's chest. Alternatively, any suitable means to rotatably mount the camera may be used. For example, in another embodiment, the plates of the male connector may be rotatably connected to each other allowing for a squared plate to be received by the female connector while still allowing for rotation of the mounted camera.

It will further be understood by someone skilled in the art that many of the details provided above are by way of example only and are not intended to limit the scope of the invention which is to be determined with reference to the following claims.

It will be understood by a person skilled in the art that many of the details provided above are by way of example only, and are not intended to limit the scope of the invention which is to be determined with reference to the following claims.

What is claimed is:

1. A device for rotatably mounting a camera on a person carrying a bag, the camera having a threaded female tripod receiver and the bag having a strap, the device comprising:
    a body having lateral flaps on opposite sides thereof, the lateral flaps being foldable along respective lines of weakness to allow the device to hug the strap;
    a female connector disposed on the body, the female connector having a U-shaped slot defined by a curved pocket and a pair of opposed channels which extend from the pocket; and
    a male connector having a plate and a threaded member extending from the plate for engaging the threaded female tripod receiver of the camera, the plate being slidably received by the U-shaped slot of the female connector and the plate being freely rotatable within the U-shaped slot of the female connector, wherein the plate has a first rotatable position within the pocket of the female connector in which the male connector is secured to the female connector, and a second rotatable position within the pocket of the female connector in which the male connector is releasable from the female connector.

2. The device as claimed in claim 1 wherein the lateral flaps are provided with fasteners to allow the lateral flaps to be releasably secured to one another.

3. The device as claimed in claim 1 further including a friction pad.

4. The device as claimed in claim 1 further including a support strap.

5. The device as claimed in claim 1 further including a ring for allowing the device to be tethered.

* * * * *